Dec. 15, 1942.  J. R. LITTY  2,305,177
SLICING MACHINE
Filed March 17, 1939  4 Sheets-Sheet 1
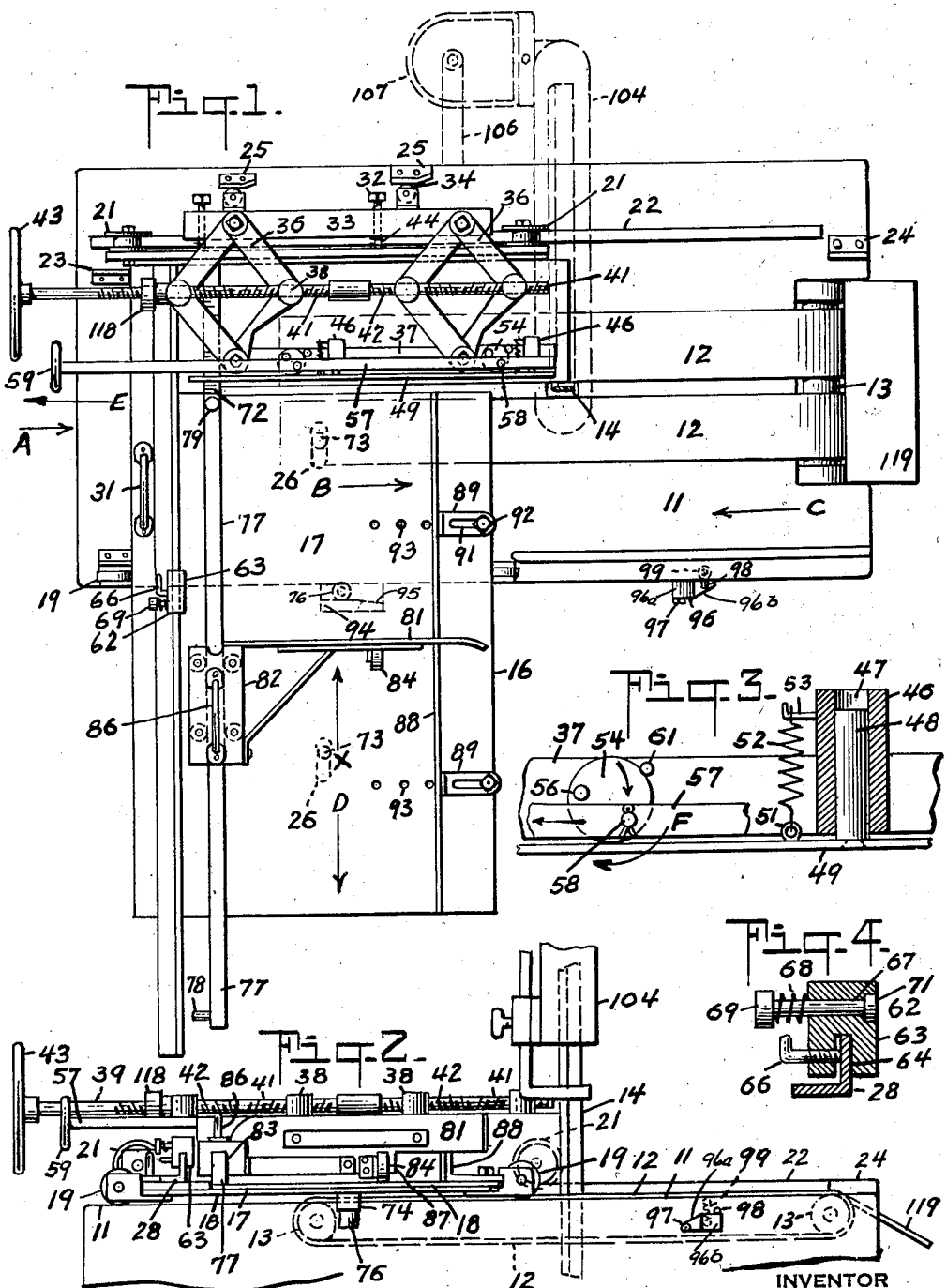
INVENTOR
JOHN R. LITTY.
BY
ATTORNEY

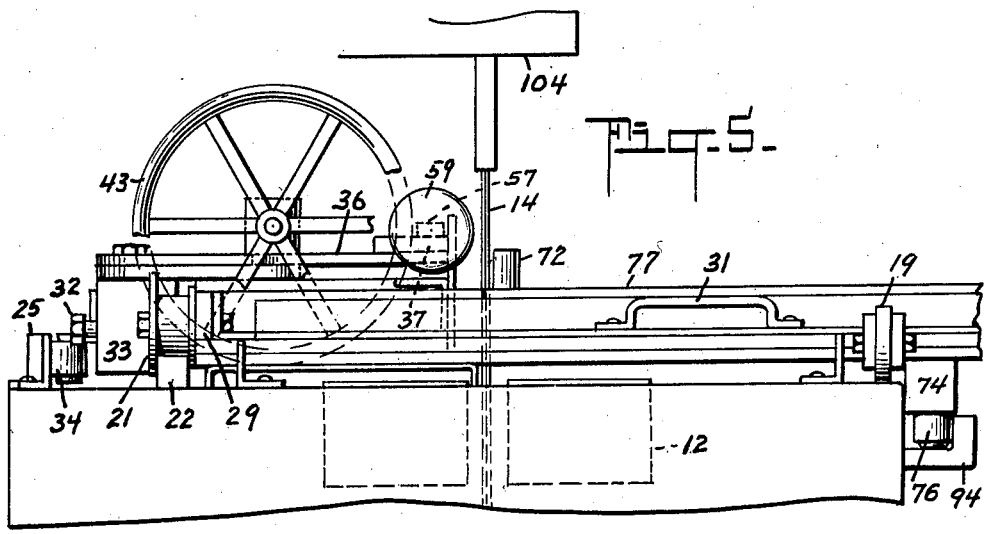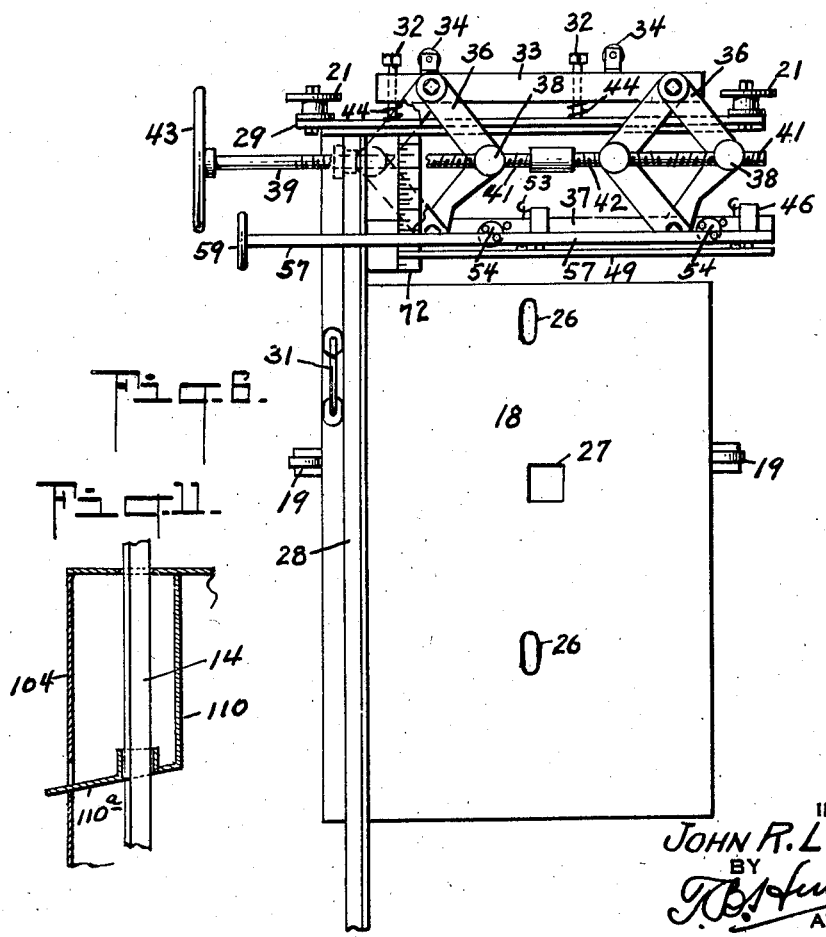

Dec. 15, 1942. J. R. LITTY 2,305,177
SLICING MACHINE
Filed March 17, 1939 4 Sheets-Sheet 3
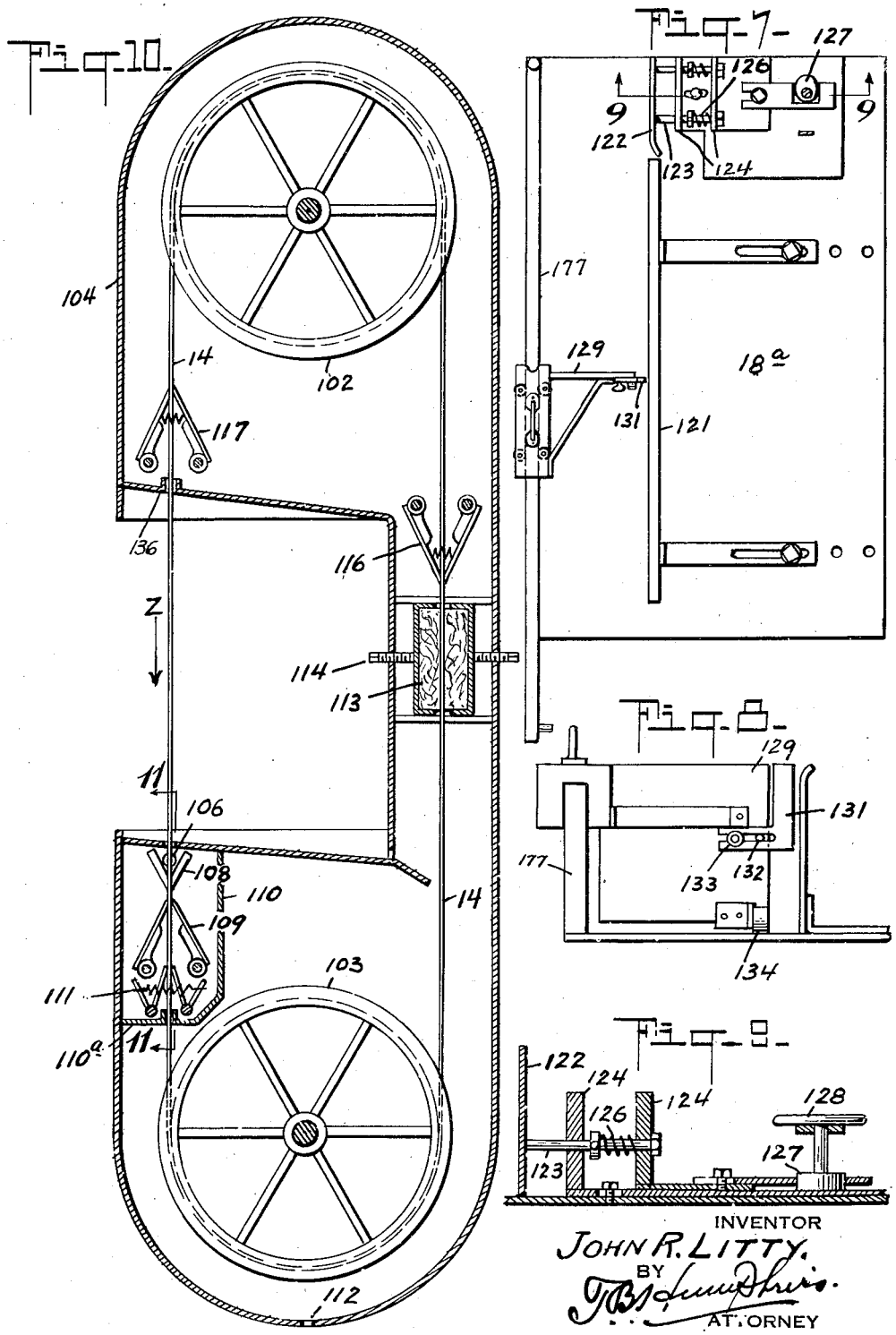
INVENTOR
JOHN R. LITTY.
BY
ATTORNEY

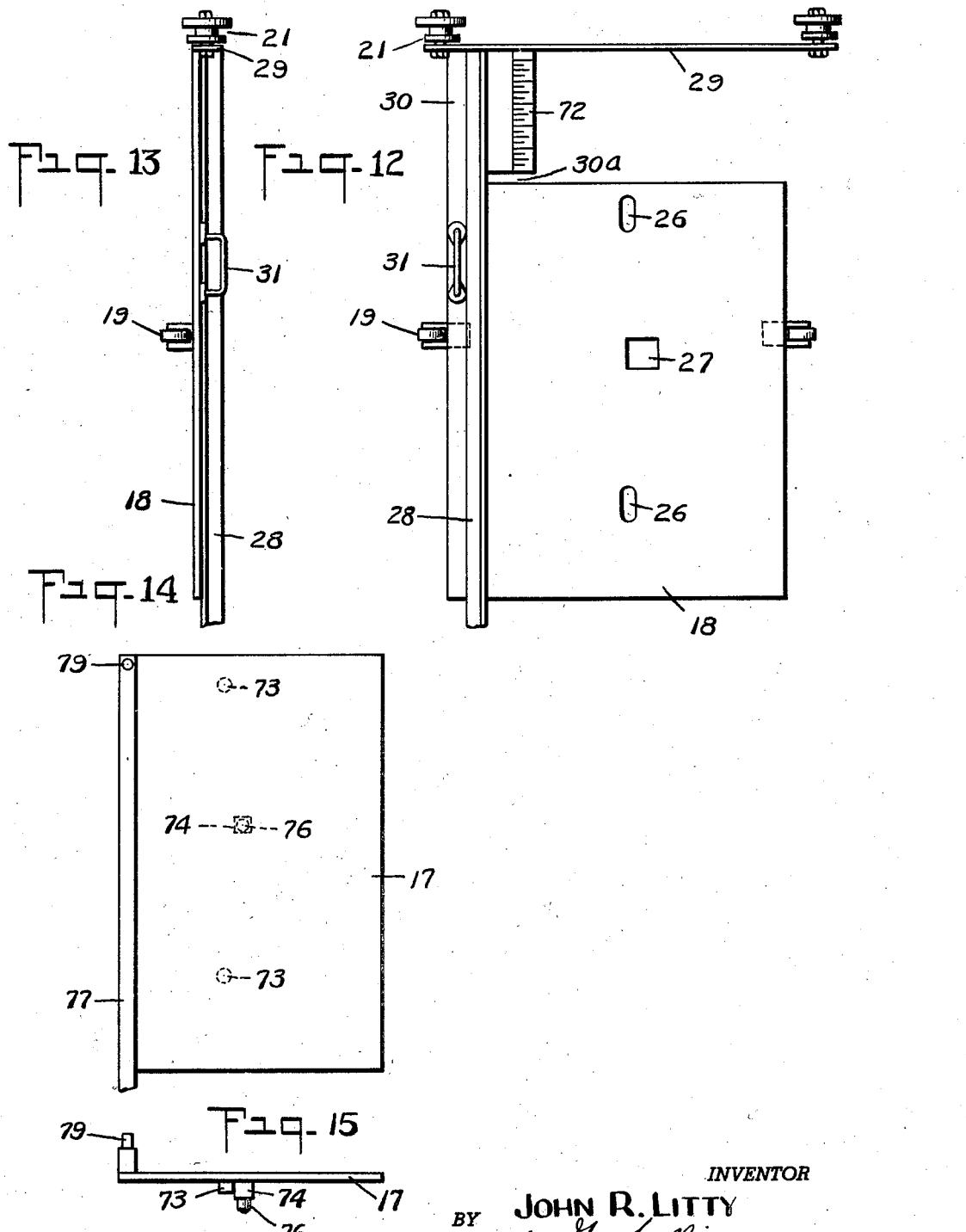

Patented Dec. 15, 1942

2,305,177

UNITED STATES PATENT OFFICE 2,305,177

SLICING MACHINE

John R. Litty, Philadelphia, Pa.

Application March 17, 1939, Serial No. 262,470

6 Claims. (Cl. 146—88)

This invention relates to a cutting machine, and has particular relation to a machine employed for cutting cake.

The machine is intended to cut large cakes into slices, long slabs of cake into either slices or smaller cakes, and jelly roll, fig bars, etc. into slices or small cakes.

The invention embodied in this application is an improvement on the type of cake cutting machine shown and described in United States Letters Patent No. 1,923,871, granted August 22, 1932, on the joint invention of John R. Litty, the inventor herein and one Trued B. Lundin. In the type of cake cutting machine shown in the patent mentioned, the limiting or slice regulating plate bears against the end of the cake from which a slice is to be cut during the time that the knife severs the slice and upon the return trip of the reciprocating table to its original or starting point, the cake body frictionally engages the vertically moving knife which causes crumbling or tearing of the end of the cake body.

The object of the present invention is to provide means for selectively gauging the thickness of the slices to be cut from the cake body, and to automatically release that means when the slice is being cut from said cake body.

A further object of the invention is to provide means associated with said slice regulating means so that when the body of the cake is substantially exhausted, suitable support may be provided for the portion to be sliced as it engages the knife.

A still further object of the present invention is to provide means for retracting the table carrying the cake body away from the knife to prevent drag of the knife on the cake body when same starts on its return trip to the original starting position, and automatic means for returning said table to its initial location upon its arrival at said original starting position.

A still further object of the invention is to provide means for effectually cleansing the knife and for conditioning same so as to prevent drag during the process of severing slices of cake.

According to the invention, the cake slicing machine comprises a main table, a vertically moving cutting knife, a conveyor, a reciprocable slotted table for carrying a cake to be sliced, said cutting knife operating in said slot and adapted to cut a slice from the forward end of said cake body, means for limiting the thickness of the slice to be cut, and means for automatically retracting said limiting means when said reciprocable table is moved forward to sever a slice from said cake body.

The machine is also provided with means for automatically retracting said reciprocable table away from said knife upon its return trip to original starting position in order that the knife shall not frictionally engage the end of the cake body, and means for returning said reciprocable table to its original location upon its arrival at its initial starting position.

The drawings illustrate an embodiment of the invention, and the views therein are as follows:

Figure 1 is a top plan view of the cake cutting machine, and shows the knife mounting means and cover in dotted lines, Figure 2 is a front elevation of the machine with the bottom broken away, Figure 3 is a small detail section showing the mechanism for holding the end of the cake when the cake body is substantially exhausted, Figure 4 is a cross sectional view of the trim slice limiting member, Figure 5 is an enlarged partial end view of the machine looking in the direction of the arrow "A" in Figure 1, with part of the mechanism broken away, Figure 6 is a top plan view of the reciprocating mechanism with the top plate removed, Figure 7 is a top plan view of means employed for cutting thin cake sections such as fig newtons, wafers, etc., Figure 8 is a front end view of the same, Figure 9 is a cross-sectional view on the line 9—9 of Figure 7, Figure 10 is an enlarged vertical sectional view showing the means for mounting the vertically moving knife, and means for cleansing and conditioning same, Figure 11 is a detail vertical sectional view taken on the line 11—11 of Figure 10, Figure 12 is a plan view of the bed plate shown in Figures 1 and 6 with parts removed for clearness of illustration, Figure 13 is a side elevational view of the bed plate shown in Figure 12, Figure 14 is a plan view of the upper plate illustrated in Figure 1, and Figure 15 is an end elevational view of the upper plate shown in Figure 14.

As illustrated in the drawings, the machine has a main stationary table 11 having a pair of belt conveyors 12 passing over suitable rollers 13, and a vertically moving knife 14 located between said conveyors.

The reciprocating table 16 comprises an upper plate 17 and a bed plate 18 (see Figures 1, 2, 6, 12 and 13). This bed plate is provided with front rollers 19 and flanged rollers 21, which engage the track 22 mounted on top of main table 11. The main table is provided with stop members 23 and 24 for limiting the movement of the reciprocable table, and is provided with cam plates 25 along the rear edge thereof.

The bed plate 18 has slotted holes 26 and an intermediate hole 27, the purpose of which is later explained. The bed plate has an angle bar 28 at the left hand side of the same which together with a relatively small generally rectangular portion 30 of the bed plate extends to and connects with a plate 29 which carries the flanged rollers 21. Portion 30 is slotted as indicated at 30a for receiving knife 14 in a manner to be described. The bed plate is provided with a hand grip 31 for grasping the mechanism to reciprocate the table. Extending out from the plate 29 are a pair of studs 32 which carry a bar 33 movable thereon. This bar has rollers 34 secured to the rear face thereof.

Pivotally mounted on the bar 33 are a pair of toggle members 36 while the forward ends of said toggle members are pivotally connected to a bar 37. The toggle members are provided with upstanding posts 38 which engage a screw member 39 which is provided with right hand threads 41 and left hand threads 42. The screw member is provided with a hand wheel 43 for adjusting the distance between the bars 33 and 37, as hereinafter explained.

Between the bar 33 and plate 29 spiral springs 44 tend to push the bar 33 against the heads of the studs 32. The bar 37 has blocks 46 mounted thereon, and these blocks are bored, as at 47 (see Figure 3), and pins 48 are slidably mounted in said bores. These pins are fastened at their forward ends to a limiting or slice regulating plate 49. This plate 49 is provided with links 51 to which the front ends of spiral springs 52 are connected, while the rear ends of said springs are fastened to hooks 53 mounted on the blocks 46. This bar 37 (see Figure 6) is provided with a pair of cams 54 which are pivotally mounted on said bar at 56 (see Figure 3). The cams are fastened to an operating bar 57 by a pin 58, and this bar is provided with a hand member 59 (see Figure 6). The bar 37 has pins 61 mounted thereon for limiting the movement of the cams 54 either by the action of the operating bar 57 or through the tension of the spiral springs 52.

A trim slice regulating device 62 comprising a block 63 has a slot 64 fitting over the upstanding leg of the angle bar 28, and a screw pin 66 may be tightened to secure the said device at any desired place along the length of said angle bar. The block is also provided with a laterally movable pin 67 which has a spiral spring 68 surrounding said pin between said block and the head 69 of said pin, so as to keep the forward end 71 of said pin retracted. Fastened to the portion 30 of bed plate 18 and plate 29 is a scale bar 72 for positioning or gauging the limiting or slice regulating plate 49. The upper plate 17 rests upon the bed plate 18, and is provided with a pair of rollers 73 which fit into the slots 26 in said bed plate while an extension 74 on the bottom of said upper plate fits through the hole 27 with sufficient play to allow the movement of the rollers 73 in the slots 26 as later explained. This extension 74 is provided with a roller 76.

The upper plate 17 is provided with a fixed rail 77 which has a stop member 78 at its front end and a stop member 79 at its rear end. This rail has a cake body advancing plate 81 fastened to a block 82 with a slot 83 into which said rail fits. The plate is provided with a roller 84 while the block has a hand gripping member 86 for pushing the plate 81 in the direction of the arrow X for advancing the cake body against the limiting or slice regulating plate 49. This cake body advancing plate may be cut out, as at 87 (see Figure 2) to provide space for passing over the guide rail 88. This guide rail is secured to brackets 89 having slots 91 through which bolts 92 extend and fit into any of the series of holes 93.

For a purpose to be later described, it is desired that the upper plate 17 be permitted to move downwardly or in the direction of the arrow D (Figure 1) a slight distance relative to bed plate 18 as the plates 17 and 18 are moved to the right or in the direction of the arrow B. Also, it is desired on the return stroke of the plates that plate 17 be moved slightly upwardly or towards the table 11 so that upon the completion of the return stroke, plate 17 is in its starting position, as illustrated in Figure 1. The mechanism for effecting movement of upper plate 17 away from and towards the stationary table will now be described. A camming element, generally indicated at 94 is L-shaped in cross-section, and the base of the L extends horizontally beneath roller 76 with slight clearance and is weldingly or otherwise suitably secured to the front face of stationary table 11. The upstanding leg of the L provides a camming surface having a portion 95 thereof inclined away from front face of table 11 proceeding towards the right, as viewed in Figure 1. As previously explained, roller 73 disposed on the under side of upper plate 17 extends into elongated slots 26 provided in base plate 18 and the extension 74 to which roller 76 is secured extends into slot 27 in base plate 18. Slot 27 is of sufficient size to permit movement of extension 74 therewithin substantially corresponding to the movement of roller 73 in slots 26. Thus, the upper plate 17 is permitted to move towards and from the front face of stationary table 11 relative to bed plate 18. When plates 17 and 18 are moved in the direction of arrow B a sufficient distance for roller 76 to clear camming element 94, plate 17 may be moved away from the front face of stationary table 11, and this is effected by a depressible cam generally indicated at 96. Cam 96 is pivotally mounted, as at 97 (see Figure 2), and is urged upwardly against a limiting pin 98 by a spiral spring 99 secured thereto and to table 11. Cam 96 has an inclined surface 96$^a$ disposed in the path of roller 76, so that when plates 17 and 18 are moved in the direction of arrow B, roller 76 will engage inclined surface 96$^a$, and force cam 96 downwardly permitting roller 76 to pass over and beyond depressible cam 96. Spring 98 will then lift the cam to the position illustrated in Figure 2. Cam 96 is also provided with a vertical surface 96$^b$ inclined outwardly from the front face of table 11 proceeding towards the left or in the direction of arrow C. Thus, on the retractive movement of plates 17 and 18 in the direction of arrow C, cam 96 cannot be depressed and roller 76 will engage surface 96$^b$, and force upper plate 17 in the direction of arrow D or away from table 11. Near the completion of the retractive stroke, roller 76 will engage portion 95 of camming element 94, and be forced towards table 11 to return upper plate 17 to its original position relative to bed plate 18.

The vertically moving knife 14 (see Figure 10) passes over pulleys 102 and 103 having a housing or covering 104. The knife moves in the direction shown by the arrow Z. Immediately below the main table 11, is a pipe 106 leading from a water supply tank 107 (see Figure 1). This pipe supplies water to guides 108 which direct the same against the surfaces of the knife. Immediately below the guides 108 are adjustably fixed scrapers 109 which are intended to cleanse the knife of any material adhering thereto, while the spring scrapers 111 further cleanse the said knife and remove water therefrom. The guides 108, scrapers 109 and 111 are all housed in a box 110 whose bottom 110$^a$ is sloped and extends outside of the cover 104 so that the material removed from the knife may be directed into a receptacle and thus prevented from following the knife. The water directed against the knife may be taken from the housing or covering 104 in any suitable manner, such as for instance, as the hole 112 at the bottom thereof. The knife passes through a stuffing box 113 having adjusting members 114, and above this packing box are spring scrapers 116. Just before the knife emerges from the housing or covering 104, it engages still another pair of spring scrapers 117.

The machine is regulated and operated as follows:—

Considering that zero on the scale 72 is located directly in front of the edge of the knife 14, the hand wheel 43 is turned to regulate the limiting or slice regulating plate 49 for the exact thickness of the slices to be cut. When this plate 49 has been set by means of the scale 72, the lock nut 118 is tightened and the machine ready for operation.

In cutting large cakes or slabs of cakes, a trim slice is always taken for trimming the end therefrom. As all cakes or slabs of cake are of substantially equal dimensions, the trim slice regulating device 62 can be located on the angle bar 28, so that when the cake, cakes or cake slabs are pushed forward, the head 69 of the pin 67 may be pressed so as to bring the end 71 of said pin into the path of the block 82 carrying the cake body advancing plate 81, whereupon the operator grasps the hand grip 31 and moves the table in the direction of the arrow B. The end of the cake is thus severed by the knife 14 and the roller 76 on the extension 74 pushes the depressible cam downward and passes thereover. When the reciprocating table strikes against the limiting member 24, the cake or cakes have all been trimmed and the trim slices conveyed by the belt conveyors 12 over the chute 119.

When the table is pulled in the direction of the arrow C, the roller 76 will strike against the cam face of the depressible cam 96 and the upper plate 17 will move in the direction of the arrow D by virtue of the small rollers 73 on said upper plate fitting within the slotted holes 26 in the bed plate 18. This will retract the end of the cake body from contact with the knife 14, and when the table has advanced to a position near its original starting position, the roller 76 will strike the cam face 94 and the upper table 17 be moved in a direction opposite to the direction of the arrow D, so as to move said upper plate into its original starting position.

It is now time to cut the first regular slice from the end of the cake, cakes or cake slabs. Of course, when pressure is released from the head 69 of the pin 67 in the trim slice regulating device 62, the spiral spring 68 immediately returns said pin to its retracted position so that the cake bodies may now be pushed forward by the cake body advancing plate 81 by means of the operator grasping the hand gripping member 86, and these cakes or cake bodies strike against the limiting or slice regulating plate 49.

The reciprocating table is now moved in the direction of the arrow B, and as said table moves forward, the rollers 34 clear the cam plates 25, so that the spiral springs 44 move the entire device carried by the bars 33 and 37 rearward until the bar 33 engages the heads of the studs 32. This will release all pressure from the end of the cake to be cut, and as the reciprocating table continues to move in the direction of the arrow B, the slice or slices will be severed from the cake body or bodies, and will be carried away from the belt conveyors.

Of course, the upper plate 17 of the reciprocating table will move away from the knife upon the return movement of the table in the direction of the arrow C, as heretofore explained.

Just before the reciprocating table arrives at its initial starting position, the rollers 34 will strike the cam plates 25 and the device carried by the bars 33 and 37 will be moved forward so that the limiting or slice regulating plate 49 will be moved into its original starting position, so that it will be ready to engage the end of the cake bodies for gauging the next slice or slices.

When the cake body is almost exhausted, and there is, after gauging of the last slice, very little of the body remaining on the upper plate 17, the table may be moved forward until the rollers 34 clear the cam plates 25. Whereupon, the operator may pull the operating wheel 59 on the operating bar 57 in the direction of the arrow E (see Figure 1) whereupon the cams 54 will be rotated in the direction of the arrow F (see Figure 3), so as to push the limiting or slice regulating plate 49 back into its original gauging position. It will, of course, be understood that the movement of the plate 49 by virtue of the cams 54 is exactly equal to the amount of play between the outer side of the bar 33 and the heads of the studs 32. The last slice of the cake, therefore, to be severed will receive support from the limiting or slice regulating plate 49, which is quite necessary when the cake bodies are substantially exhausted.

Figures 7, 8 and 9 show an auxiliary upper plate 18$^a$ having the guide rail 121, and having a plate 122 at the rear end of the upper plate 18$^a$, which is fastened to the ends of pins 123 mounted in plates 124 with spiral springs 126 urging the plate 122 in the direction of the rail 177. This device is slidably mounted and governed by a cam 127 operated by a hand wheel 128.

In the case of long strips of wafer material, or strips to be cut into fig newtons, or the like, a number of these strips are placed on edge between the rail 177 and guide rail 121, and the plate 122 holds the same firmly with resilient tension, and enables cleaner cuts to be made.

The body advancing plate 129 is provided with an extension 131 which is regulated by means of the plate 132 and locking device 133. This body advancing plate is also provided with a roller 134.

The knife cleansing and conditioning means shown in Figure 10 is quite essential to the successful operation of cake cutting machines in general in that the knife must be kept properly cleansed of all solid matter and must be moistened to the proper degree to successfully cut cakes of different natures. The device here shown comprising the water guides, scrapers, stuffing box, etc., is designed after considerable experiment to properly cleanse the knife, so that when it passes from the housing or covering 104 at the point 136, it will be cleaned and provided just the proper amount of moisture for making a good clean sharp cut of the cake body.

Of course, the cutting machine illustrated and described herein is capable of being modified and changed in many and various ways without departing from the inventions herein set forth and hereafter claimed.

The invention is hereby claimed as follows:

1. A cake slicing machine comprising a main table, a cutting knife, a conveyor, a reciprocable slotted bed plate, a plate movably mounted on said bed plate for carrying a cake to be sliced, said cutting knife operating in said slot and adapted to cut a slice from the forward end of said cake body, means limiting the thickness of the slice to be cut, spring means for automatically retracting said limiting means when said bed plate is moved forward to sever a slice from said cake body, cam means for automatically returning said limiting means to its original position when said bed plate is returned to its starting position, cam means for automatically retracting said cake carrying plate away from said knife after the cake is sliced in order that the knife shall not frictionally engage the end of the cake body, and cam means for returning said cake carrying plate to its original location upon its arrival at its initial starting position.

2. A cake slicing machine comprising a main table, a cutting knife, a conveyor, a slotted reciprocable bed plate, a plate movably mounted on said bed plate for carrying a cake to be sliced, said cutting knife operating in said slot and adapted to cut a slice from the forward end of said cake body, means mounted on said bed plate and moving therewith for limiting the thickness of the slice to be cut, cooperating means between the bed plate and said limiting means for automatically retracting said limiting means when said cake carrying plate is moved forward to sever a slice from said cake body, and a plate carried by said limiting means for supporting the forward end of the cake body when same is nearly exhausted and adapted to be manually drawn into the original position of said limiting means.

3. A cake slicing machine comprising a main table, a cutting knife, a conveyor, a reciprocable slotted bed plate, a plate movably mounted on said bed plate for carrying a cake to be sliced, said cutting knife operating in said slot and adapted to cut a slice from the forward end of said cake body, means mounted on said bed table and moving therewith for limiting the thickness of the slice to be cut, cooperating means between the bed plate and said limiting means for automatically retracting said limiting means when said cake carrying plate is moved forward to sever a slice from said cake body, means connecting said limiting means and cooperating with means on said bed plate for automatically returning said limiting means to its original position when said bed plate is returned to its starting position, and a plate carried by said limiting means for supporting the forward end of the cake body when same is nearly exhausted and adapted to be manually drawn into the original position of said limiting means.

4. A cake slicing machine comprising a main table, a cutting knife, a conveyor, a slotted reciprocable bed plate, a plate mounted on said bed plate and movable relative thereto at right angles to the direction of reciprocation for carrying a cake to be sliced, said cutting knife being operable in said slot and adapted to cut a slice from the forward end of said cake, a plate mounted on said bed plate and movable therewith for engaging the forward end of the cake to limit the thickness of the slice to be cut, cooperating means between the bed plate and said limiting plate for automatically retracting said limiting plate when the cake carrying plate is moved forward to sever a slice from said cake, said cooperating means comprising resilient means urging the limiting plate away from the forward end of the cake, and cam means rendering the resilient means inoperative until the bed plate has been moved a predetermined distance towards the knife.

5. The cake slicing machine as described in claim 4, and wherein reverse movement of the bed plate away from the knife causes the limiting plate to be returned to its original position by the cam means.

6. A cake slicing machine comprising a main table, a cutting knife, a conveyor, a reciprocable bed plate, a cake carrying plate mounted on said bed plate, said cutting knife being adapted to cut a slice from the forward end of said cake, means limiting the thickness of the slice to be cut, said limiting means comprising spaced toggle members carrying a plate engageable with the forward end of the cake, said toggle members being mounted on the bed plate and movable therewith, spring means urging the toggle members in a direction to bring the limiting plate out of engagement with the forward end of the cake, cam means maintaining the limiting plate in contact with the forward end of the cake until the bed plate is moved a predetermined distance towards the knife, cam means for returning the limiting plate to its original position upon reverse movement of the bed plate to starting position, and means for adjusting the toggle members to vary the thickness of a cake slice.

JOHN R. LITTY.